US007224559B2

(12) United States Patent
Henze et al.

(10) Patent No.: US 7,224,559 B2
(45) Date of Patent: May 29, 2007

(54) DIFFERENTIAL CURRENT DETECTION

(75) Inventors: Christopher P. Henze, Lakeville, MN (US); Rohit K. Tirumala, Minneapolis, MN (US)

(73) Assignee: General Motors Corporation, Detroit, MI (US)

( * ) Notice: Subject to any disclaimer, the term of this patent is extended or adjusted under 35 U.S.C. 154(b) by 244 days.

(21) Appl. No.: 10/850,769

(22) Filed: May 21, 2004

(65) Prior Publication Data

US 2005/0259371 A1    Nov. 24, 2005

(51) Int. Cl.
*H02H 3/00* (2006.01)
(52) U.S. Cl. .......................................... 361/44; 361/45
(58) Field of Classification Search .................. 361/44, 361/45; 324/117 R
See application file for complete search history.

(56) References Cited

U.S. PATENT DOCUMENTS 3,609,458 A * 9/1971 Penn ............................. 361/45
3,699,442 A * 10/1972 Riley ........................... 324/98
4,118,597 A * 10/1978 Proctor et al. ............... 379/378
4,278,939 A * 7/1981 Henry ...................... 324/117 R
4,280,162 A * 7/1981 Tanka et al. .................. 361/45
4,542,432 A * 9/1985 Nichols et al. ............... 361/44

OTHER PUBLICATIONS

"LM1851 Ground Fault Interrupter", 1995 National Semicondcutor Corporation, Jun. 1992, pp. 1-8.
A.S. Kislovski, Ascom Hasler Ltd, Berne, Switzerland, "Linear Variable Inductor In D.C. Current Sensors Utilized In Telecom Solar Battery Chargers", IEEE Telecommunications and Energy Conference, INTELEC, Oct. 18, 1989, pp. 23.2/1-23.2/3, vol. 2.

* cited by examiner

*Primary Examiner*—Brian Sircus
*Assistant Examiner*—Scott Bauer
(74) *Attorney, Agent, or Firm*—Christopher DeVries (57) ABSTRACT

A detection circuit detects a difference between a source current and a return current. The detection circuit includes a constantly biased magnetic core through which conductors of the source and return currents extend, and a sense winding around the core. The sense winding carries an AC signal. A sensing circuit connected with the sense winding senses a change in small signal impedance of the sense winding relative to the core. This detection circuit can be used to protect people and equipment against accidental contact with high-voltage DC systems.

21 Claims, 6 Drawing Sheets

DIFFERENTIAL CURRENT DETECTION

FIELD OF THE INVENTION

The present invention relates generally to detecting ground fault currents and other differential currents and more particularly to detecting differential current in a direct current (DC) circuit.

BACKGROUND OF THE INVENTION

Electrical codes typically require that ground fault circuit Interrupters (GFCIs) be installed in a plurality of locations. In homes, for example, GFCIs may be required to be installed in kitchens, bathrooms and garages. Many ground fault protectors are available commercially for use in 120 VAC and/or 240 VAC circuits. A typical home GFCI uses a differential current transformer that can detect a differential current as low as 5 milli-amperes on a pair of wires carrying 15 amperes of AC current. A detected difference between source and return currents typically indicates the presence of a ground fault. Building codes frequently specify, for example, that a 120 VAC circuit is to be opened in response to a detected ground fault current greater than 5 milliamperes.

Although differential current detection devices generally are inexpensive and effective when used in AC circuits, they are not designed to detect faults in direct current (DC) circuits. Although electric circuit breakers are available with a DC ground fault trip capability, they are expensive and not sufficiently sensitive to detect the relatively low levels of fault current typically specified as ground fault trip thresholds when people are to be preferred.

One growing area of use for DC circuits is in supplying power for electric vehicles and hybrid electric vehicles. Automotive power sources can provide high voltages, e.g., between 400 and 800 volts DC, and it is desirable to provide ground fault detection in these systems. As previously discussed, however, the differential current detection devices which are currently available are expensive and inadequate for detecting differential current in DC circuits.

SUMMARY OF THE INVENTION

The present invention, in one embodiment, is directed to a detection circuit that detects a difference between a source current and a return current. The detection circuit includes a constantly biased magnetic core through which conductors of the source and return currents extend. The detection circuit also includes a sense winding around the core. The sense winding carries an AC signal. A sensing circuit connected with the sense winding senses a change in small signal impedance of the sense winding relative to the core.

In another embodiment, a detection circuit that detects a difference between a source current and a return current includes a pair of magnetic cores through which conductors of the source and return currents extend. A bias winding and a sense winding are around each core. The bias windings carry opposed DC signals. The sense windings carry an AC signal. A sensing circuit driven by the AC signal senses a shift in at least one operating point set by at least one of the DC signals relative to at least one of the cores.

A detection circuit in another embodiment detects a difference between a source current and a return current. The detection circuit has a magnetic core through which conductors of the source and return currents extend. A bias winding and a sense winding are around the core, the bias winding carrying a DC signal, the sense winding providing a small signal impedance to the core. A sensing circuit senses a change in the small signal impedance.

An embodiment of method of detecting a difference between a source current and a return current includes conducting the source and return currents through a pair of oppositely biased magnetic cores. The method further includes generating a small signal impedance in a sense winding around one of the cores, and sensing a change in the small signal impedance.

In yet another embodiment, a vehicle includes a detection circuit that detects a difference between a source current and a return current in an electrical circuit of the vehicle. The detection circuit includes a magnetic core through which conductors of the source and return currents extend, and a bias winding and a sense winding around the core. The bias winding is biased by a DC signal. The sense winding carries an AC signal. A sensing circuit connected with the sense winding senses a shift in an operating point set by the DC signal relative to the core.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of exemplary embodiments is merely exemplary in nature and is in no way intended to limit the invention, its application, or uses.

Figure 1:
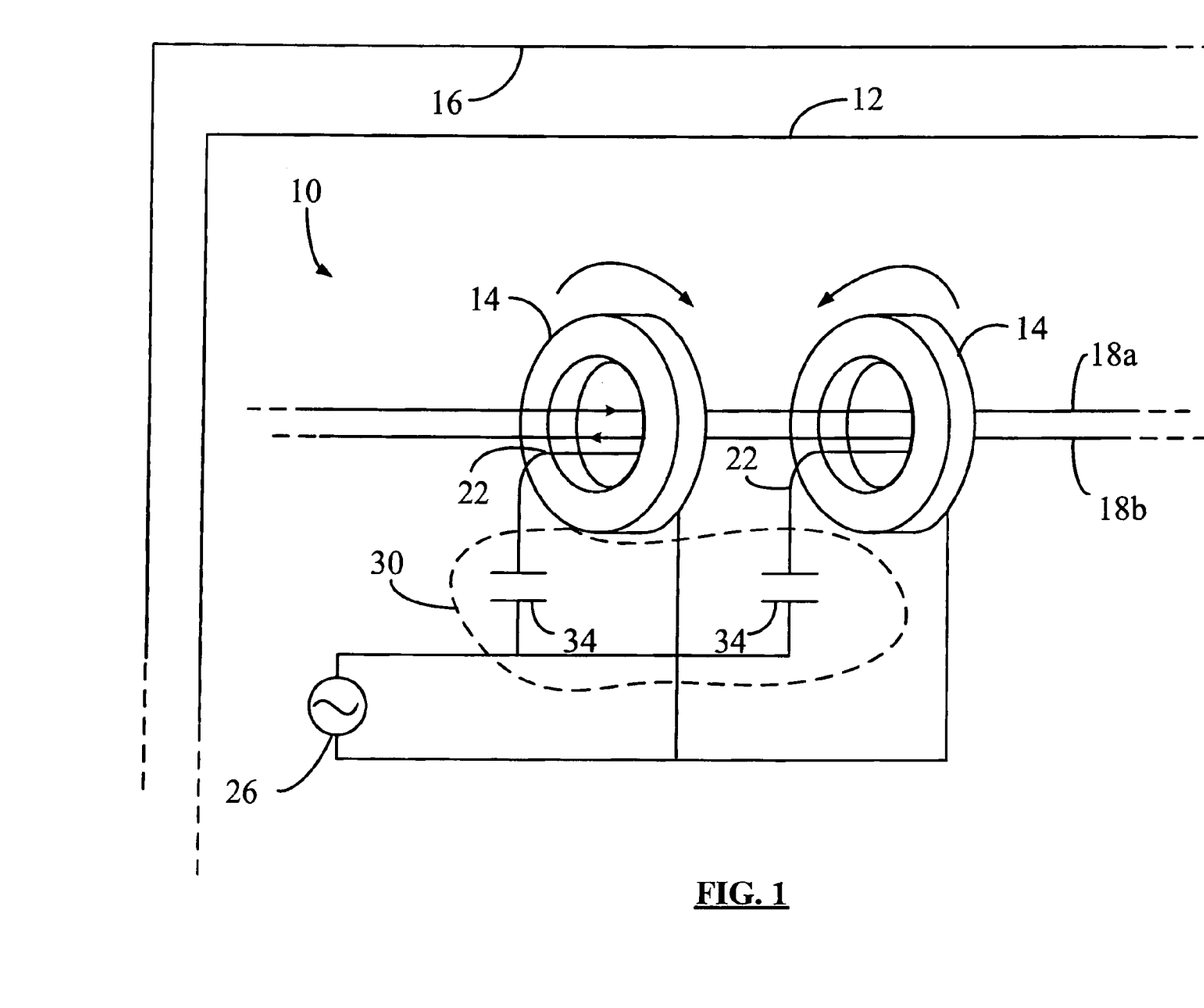
FIG. 1 is a diagram of a detection circuit for detecting a difference between a source current and a return current in an electrical system of a vehicle according to one embodiment of the present invention.

An embodiment of a detection circuit for detecting a difference between a source current and a return current is indicated generally by reference number 10 in FIG. 1. The detection circuit 10 is included, for example, in a power circuit 12 of an electric or hybrid vehicle 16. It is contemplated, however, that embodiments of the present invention could be used in other applications.

The detection circuit 10 includes two magnetic, e.g., ferrite, cores 14. Two conductors 18 in the power circuit 12 extend through the cores 14. The conductors 18 respectively conduct source and return currents between a power source, e.g., a battery, and an electrical load of the vehicle 16. The source and return currents may be high-voltage DC currents, for example, between 400 and 800 volts. Embodiments also could be used, however, in connection with higher and/or lower voltages.

Each core 14 is biased in opposite directions with DC current, as further described below. Each core 14 also has a sense winding 22 connected to an AC source 26. A sensing circuit 30 includes capacitors 34 respectively connected in series with the sense windings 22. The capacitors 34 are driven by the AC source 26 as further described below. It should be noted that the sensing circuit 30 may be embodied in various ways such that a shift in an operating point of a core 14 can be sensed as further described below.

Figure 2:
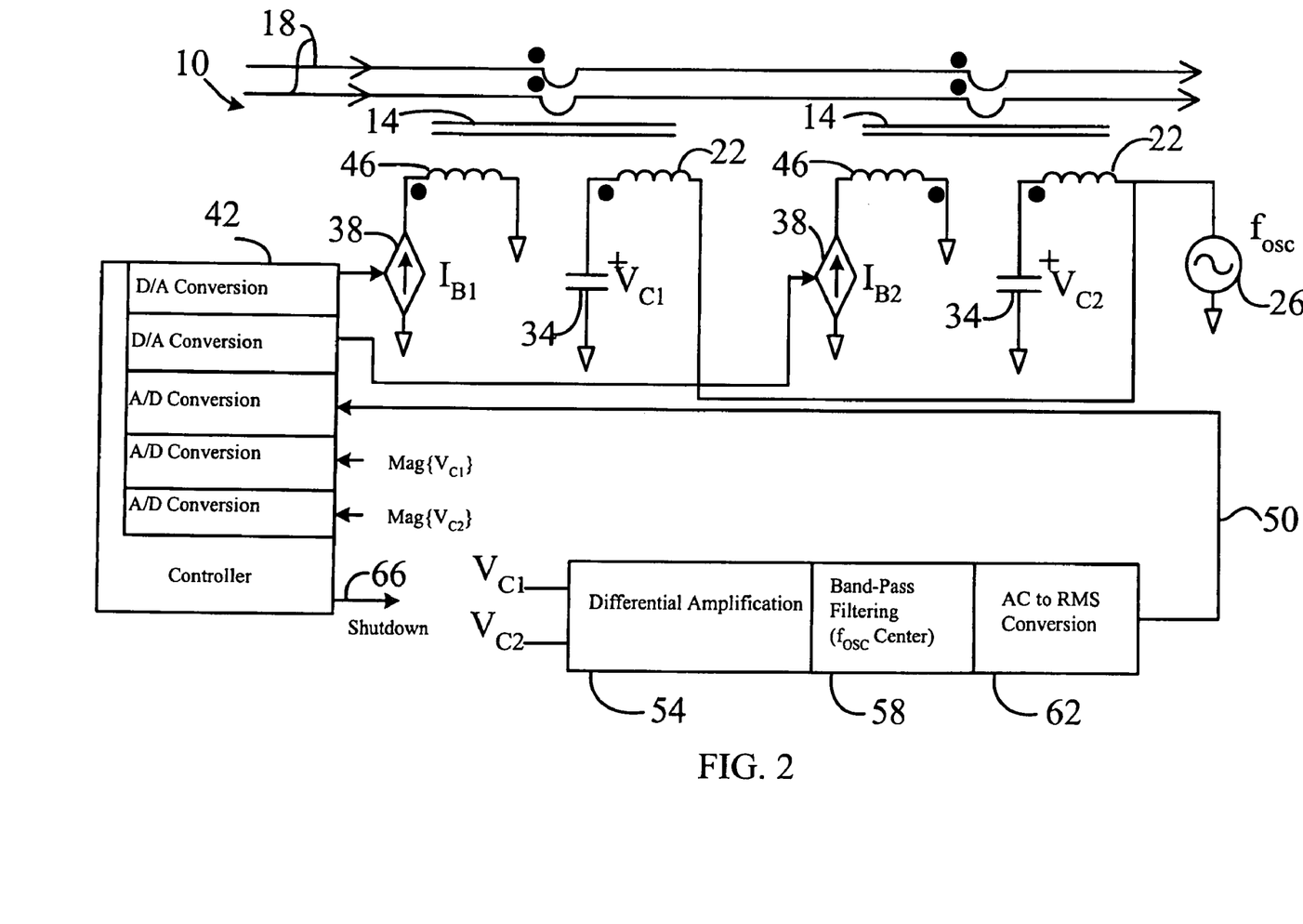
FIG. 2 is a diagram of a detection circuit for detecting a difference between a source current and a return current in an electrical system of a vehicle according to one embodiment of the present invention.

The circuit 10 is shown in greater detail in FIG. 2. Adjustable DC current sources 38 are controlled by a controller 42 and are connected to bias windings 46 on each core 14. The controller 42 issues one or more digital signal(s) which are converted to analog and input to the current sources 38, to produce DC bias fields, typically expressed in units of amp-turns per meter. Each core 14 is biased with DC current via the current sources 38, preferably such that an H-field for the core is brought to a level of moderate saturation as further described below. The cores 14 are constantly and opposedly biased so that the H-fields are in opposite directions. In another embodiment, the cores 14 may include permanent magnet components which are permanently biased to provide opposing H-fields.

The series combination sense windings 22 and capacitors 34 receive a sinusoidal voltage of, e.g., approximately 20 volts peak-to-peak at a frequency $f_{OSC}$ between approximately 10 and 20 kilohertz, e.g., about 14 kilohertz. Other voltages and/or frequencies, however, could be used. The signal from the voltage source 26 does not have to be sinusoidal but could be another time varying signal.

Voltage signals $V_{C1}$ and $V_{C2}$ across the capacitors 34 are processed to produce an analog signal 50 that represents differential current through the conductors 18. In one embodiment, analog processing of the voltage signals $V_{C1}$ and $V_{C2}$ includes using differential amplification 54, band-pass filtering 58 to pass a band centered about the frequency $f_{OSC}$ of the signal from the AC source 26, and AC-to-RMS conversion 62. AC-to-RMS conversion converts AC with the oscillator frequency to a DC (or slowly varying) signal proportional to the RMS of the differential signal. The controller 42 converts the signal 50 to a digital signal which is used as described further below. The magnitudes of voltages $V_{C1}$ and $V_{C2}$ also are input as analog signals to the controller 42, which converts them to digital signals. The magnitudes of voltages $V_{C1}$ and $V_{C2}$ may be used by the controller 42, for example, in calibrating the circuit 10. Generally, it should be understood that the signal processing components indicated in FIG. 2 are exemplary only, and that many different analog and/or digital signal processing components and/or combinations thereof could be used in various embodiments.

Figure 3:
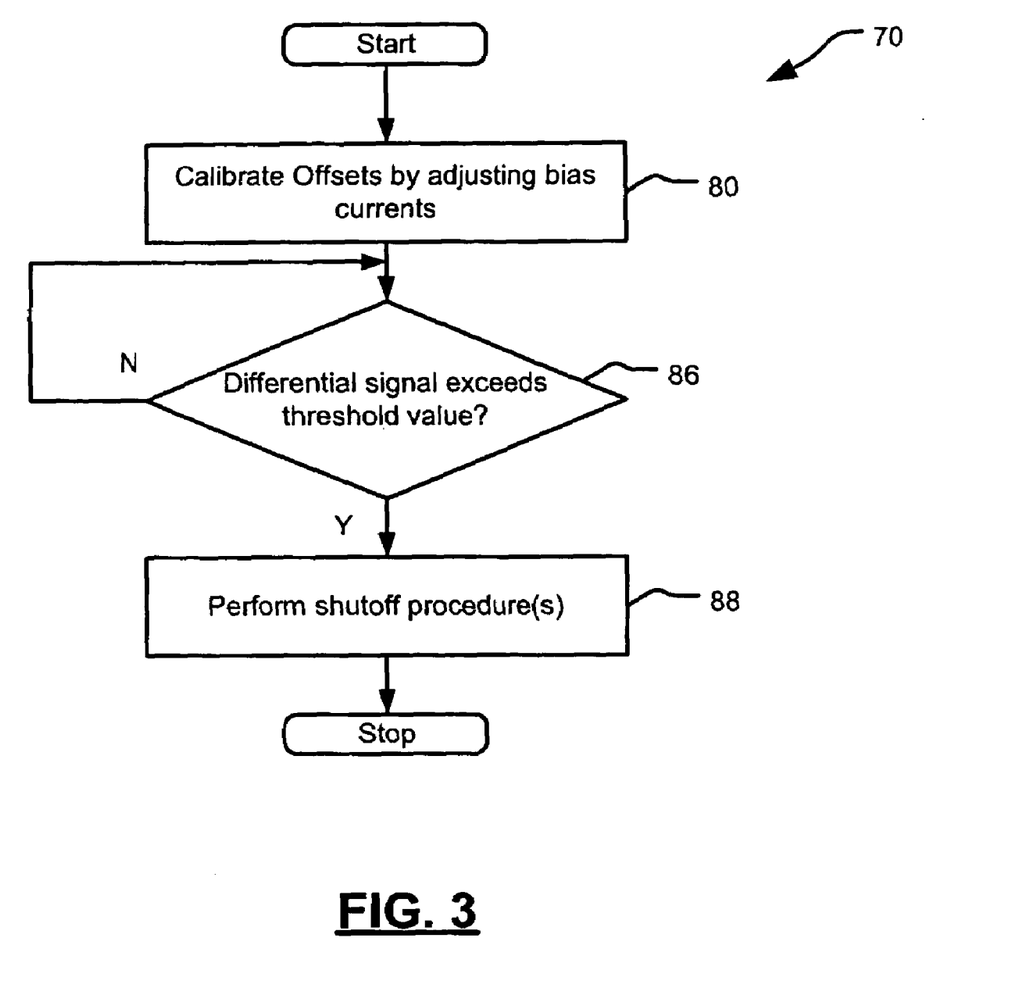
FIG. 3 is a flow diagram of an embodiment of a method of monitoring for differential current through two conductors.

The controller 42 uses the differential signal 50 to determine the presence of a differential current through the conductors 18. The controller 42 may monitor the voltage signals $V_{C1}$ and $V_{C2}$ in accordance with a method indicated in FIG. 3 by reference number 70. Referring to FIGS. 2 and 3, the controller at step 80 initializes the circuit 10, for example, by calibrating offsets for the cores 14 and the voltage signals $V_{C1}$ and $V_{C2}$ by adjusting the DC bias currents from the current sources 38. If at step 86 the controller 42 detects a differential current signal 50 having a magnitude exceeding a predetermined threshold value, at step 88 the controller 42 issues a signal 66 to a shutdown circuit (not shown) that opens the vehicle power circuit 12. The shutdown circuit also may perform various steps preparatory to opening the circuit 12. If at step 86 no differential current is detected, control returns to step 86.

Figure 4:
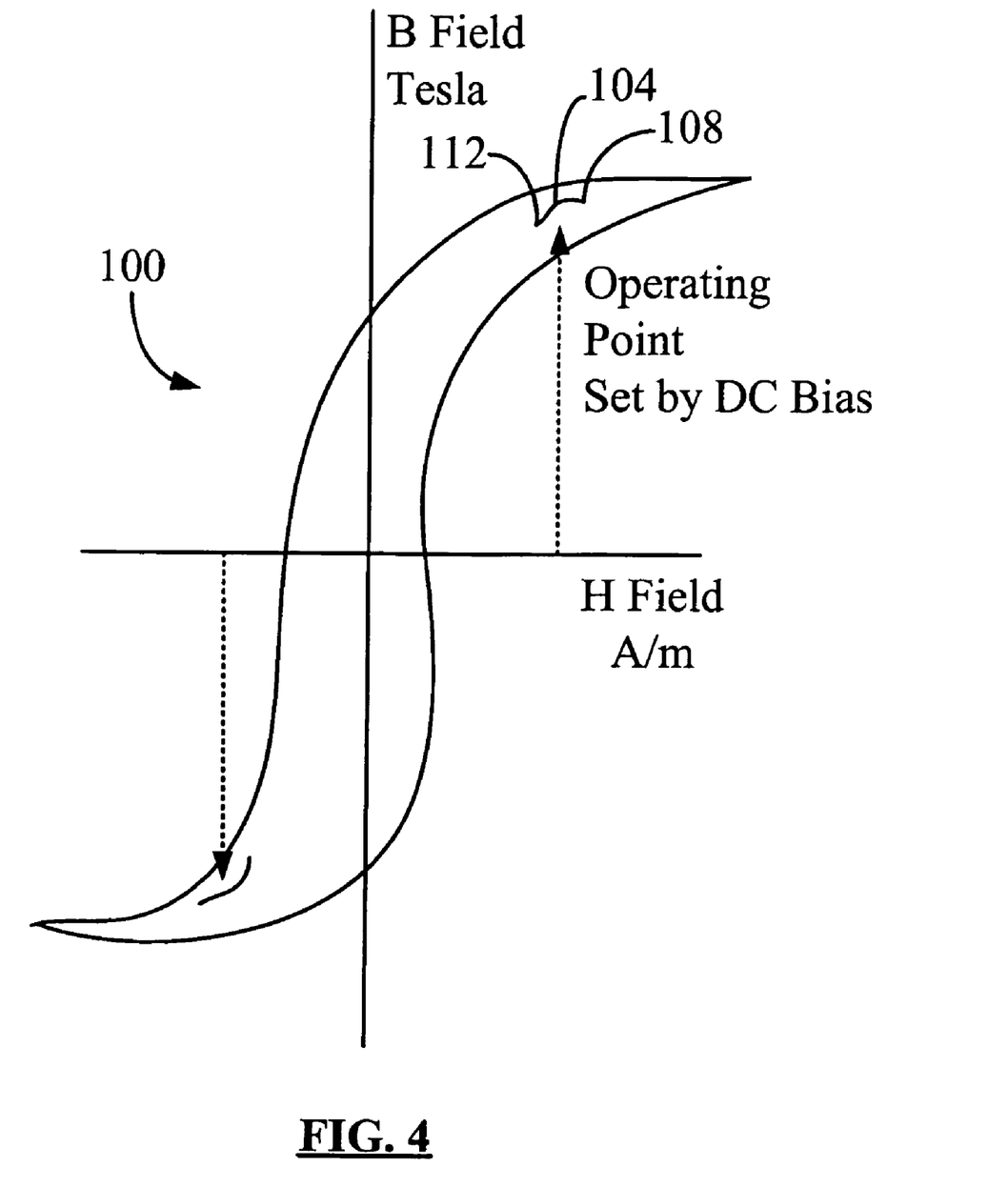
FIG. 4 is a graph of an exemplary hysteresis loop for a core according to one embodiment.

An exemplary hysteresis loop for a core 14 is indicated generally in FIG. 4 by reference number 100. A DC bias level is selected so that the B-H loop 100 preferably is bending but not deeply into saturation at an operating point 104 set by the DC bias current. The small signal impedance (also known as dynamic or AC impedance) of the core sense winding 22 varies with the slope of the B-H loop 100, for example, at the operating point 104.

If the bias point is shifted further into saturation, for example, from point 104 to a point 108, the operating point 108 has a more horizontal slope than that of the operating point 104 as shown in FIG. 4, and the small signal impedance (inductance) of the core sense winding 22 is reduced. If the bias point is shifted away from saturation, for example, from point 104 to a point 112, the small signal impedance (inductance) of the core sense winding 22 is increased as the operating point 112 has a more vertical slope than that of the operating point 104. It can be appreciated that although the operating point 104 is selected on the curve 100 preferably so as to maximize change in small signal impedance resulting from an operating point shift, selections of one or more alternative operating points also are possible.

When the detection circuit 10 is in use, voltage develops across each capacitor 34 based on the impedances of the given capacitor 34 and associated sense winding 22. Preferably, in the absence of differential current through the conductors 18 (as is the case, for example, when no ground fault current is present), the same voltage waveform appears across each capacitor 34. Where, for example, circuit element variations result in an initial differential voltage across the two capacitors 34, such voltage can be nullified and/or filtered so as to reduce noise in the circuit 10.

If there is a differential current through the conductors 18, for example, in the event of a ground fault, such differential current generates an additional H-field component for each of the cores 14. The additional H-field components increase the bias field in one core 14 and decrease the bias field in the other core 14. Such bias field changes cause capacitor voltages to decrease across one capacitor 34 and increase across the other capacitor 34. A difference in the capacitor voltages is substantially proportional to the ground fault current.

Figure 5:
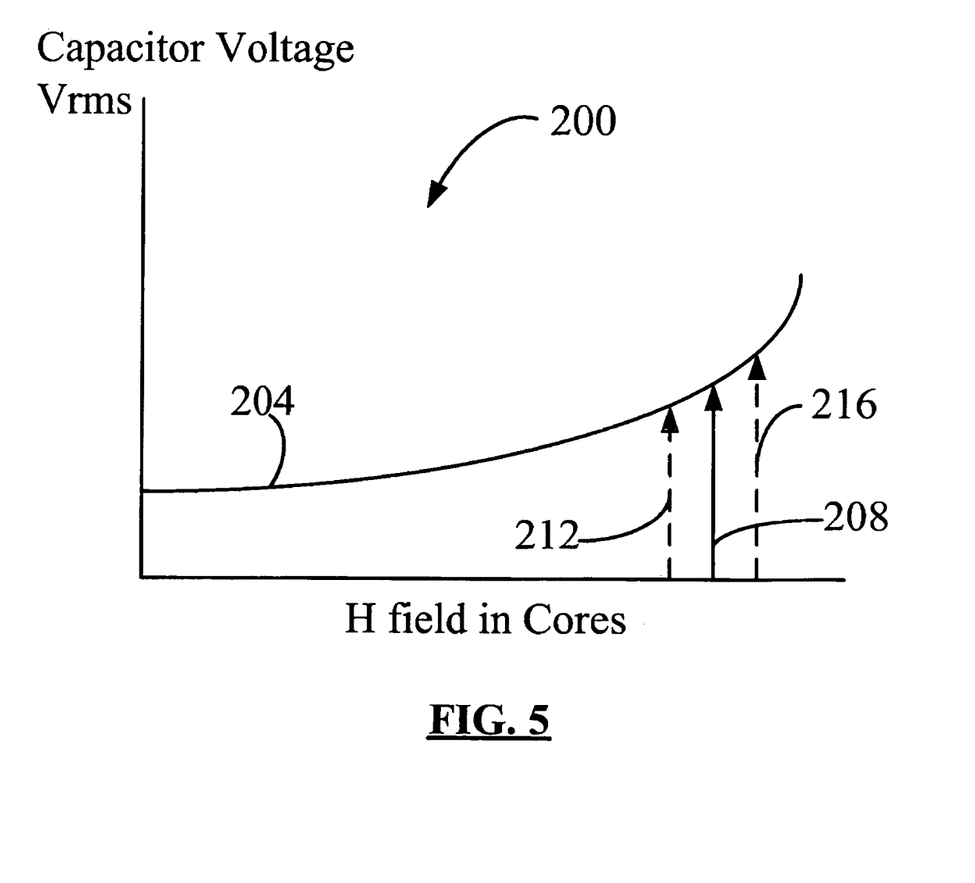
FIG. 5 is a graph of capacitor voltage relative to core H field and showing shifts in a core operating point according to one embodiment.

Exemplary shifts in operating point are shown in FIG. 5, wherein a graph of capacitor 34 voltage relative to core H field is indicated as reference number 200. A curve 204 represents voltage of the capacitor(s) 34 relative to H fields in the cores 14. A solid arrow 208 represents preferably identical operating points in both cores 14 in the absence of a difference in currents through the conductors 18. Dotted arrows 212 and 216 represent operating points for the cores 14 which have been shifted respectively left and right due to flux from a difference in currents through the conductors 18.

Small signal impedance of a sense winding 22 is affected, for example, by the number of turns in such sense winding 22, the area of the core 14 associated with such sense winding 22, core 14 material(s), and operating frequency of the sense circuit 30. Such parameters preferably are the same for both cores 14. The impedance of the sense winding is affected by flux levels. The cores 14 are preferably identical. An exemplary core 14 may have a mean path length of 12.7 centimeters and may be about 2 inches on diameter. A core 14 may be, for example, a Magnetics OP44925 toroid core, available from Magnetics, a division of Spang & Company, Butler, Pa. An exemplary DC bias winding 46 has about ten (10) turns and conducts a bias current of about 1.0 ampere. A bias level may be, for example, about 80 amperes per meter. An exemplary sense winding 22 has about fifty (50) turns. The signal source 26 delivers a signal that is, for example, about 14 kilohertz and about 20 volts peak-to-peak. Exemplary sense capacitors 34 may have capacitances of about 0.1 microfarads.

Figure 6:
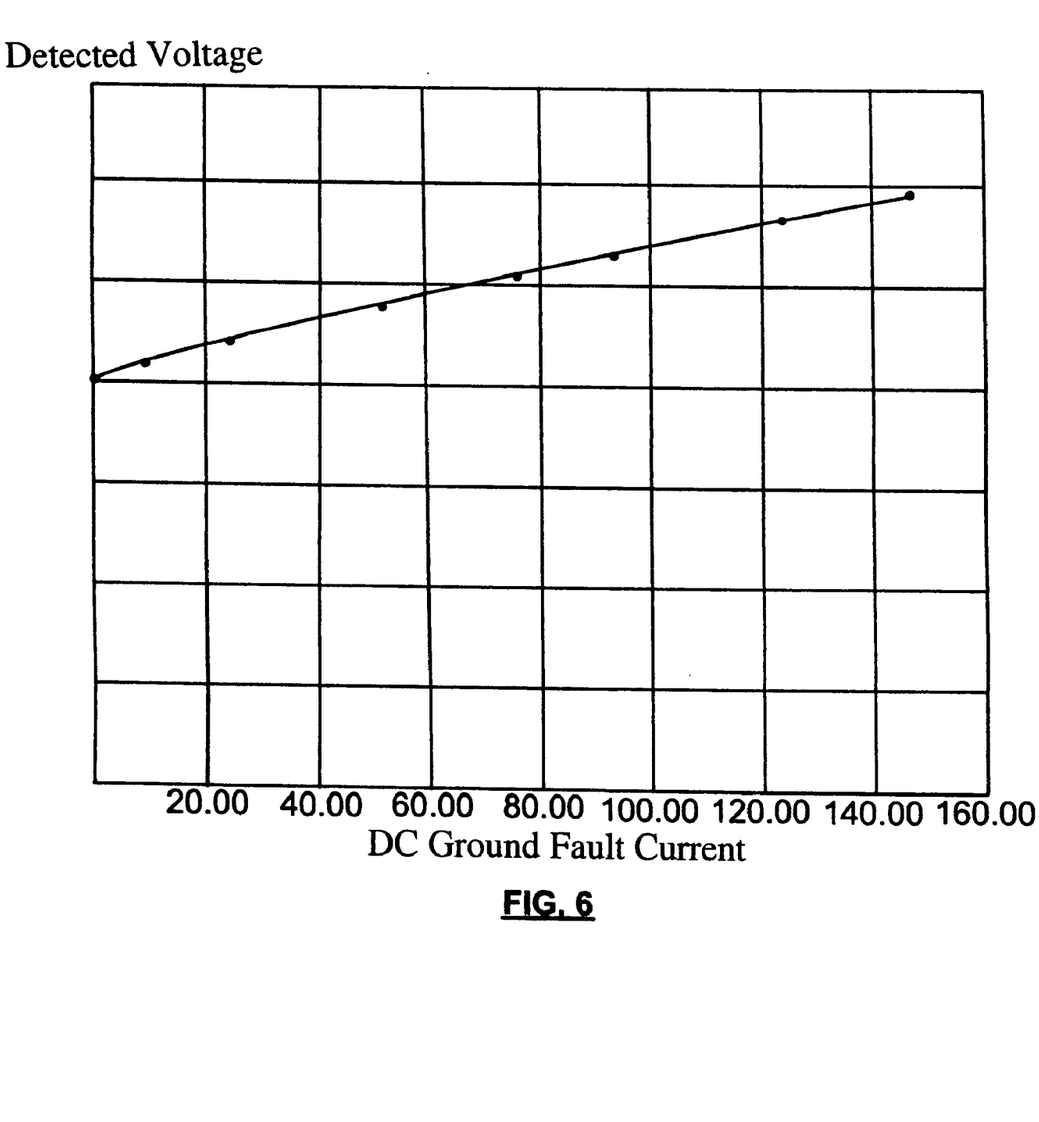
FIG. 6 is a graph of differential current measurement relative to DC ground fault current according to one embodiment.

By sensing a voltage difference between the capacitors 34, the detection circuit 10 obtains a measurement that is substantially linear relative to DC ground fault current, as shown in FIG. 6. By measuring only the magnitude of the difference in the capacitor voltages, only the magnitude of the ground fault current is sensed. If the phase is also measured, the polarity of the fault current can also be determined. The circuit 10 also can measure AC ground fault current for frequencies that are much less than the frequency $f_{OSC}$ of the sense signal. Where the frequency $f_{OSC}$ is 14 kilohertz, for example, the ground fault detection circuit 10 can be used to monitor complex ground fault currents having both AC (e.g., 60 Hz) and DC components.

In one embodiment, an initial difference voltage signal between the capacitors can be calibrated to zero, for example, by adjusting a bias current in one or both cores 14, by nulling out any offset due to volume, material and/or other differences between the cores 14, and/or by calibrating the voltages of the capacitors 34 to zero. The microcontroller 42 may be used to perform such calibration. Noise immunity may also be enhanced, for example, by using a bandpass filter in sensing the differential voltage between the capacitors 34.

A low-cost ground fault circuit interrupter can be provided using the foregoing differential current detection circuits and methods. Such a circuit interrupter can be used in connection with high-voltage DC systems, yet can measure fault current at low levels. Embodiments of the present invention are also useful for detecting a combination of AC and DC ground fault currents. Such currents may result, for example, if a ground fault occurs when auxiliary AC power is electronically generated on an electric vehicle or when a vehicle is connected to a utility for charging.

The foregoing electrical circuit and related methods provide differential current detection in a DC circuit and are particularly well suited for detecting DC ground fault currents. A detection circuit embodied in accordance with the principles described herein is simple and inexpensive compared to prior art DC differential current detection circuits. Additionally, the foregoing detection circuit can be used to detect ground faults at levels low enough to protect a person while maintaining galvanic isolation from high-voltage circuits. Fault currents can be detected while normal operating currents, for example, for electric and hybrid vehicles, can pass through the detection circuit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A detection circuit that detects a difference between a source current and a return current, the detection circuit comprising:
    a constantly biased magnetic core through which conductors of the source and return currents extend;
    a sense winding around said core;
    an AC source connected with said sense winding that transmits an AC signal to said core through said sense winding; and
    a sensing circuit connected with said sense winding that senses a change in small signal impedance of said sense winding relative to said core,
    wherein said core comprises a first core, and said sense winding comprises a first sense winding, said detection circuit further comprising:
    a second constantly biased magnetic core through which conductors of the source and return currents extend, said second core opposedly biased relative to said first core;
    a second sense winding around said second core, said second sense winding carrying said AC signal; and
    a pair of capacitors that provide a differential voltage in response to said change in small signal impedance, said differential voltage representative of the difference between the source and return currents.

2. The detection circuit of claim 1 further comprising a bias winding around said core, said bias winding biased by a DC signal.

3. The detection circuit of claim 2 wherein said core is biased near saturation.

4. The detection circuit of claim 1 wherein said sensing circuit comprises a capacitor that receives said AC signal.

5. The detection circuit of claim 1 wherein said sensing circuit comprises a capacitor in series with said sense winding.

6. The detection circuit of claim 1 further comprising a pair of opposedly wound bias windings around said cores, each bias winding biased by a DC signal.

7. A detection circuit that detects a difference between a source current and a return current, the detection circuit comprising:
    a constantly biased magnetic core through which conductors of the source and return currents extend;
    a sense winding around said core, said sense winding carrying an AC signal; and
    a sensing circuit connected with said sense winding that senses a chance in small signal impedance of said sense winding relative to said core,
    wherein said core comprises a first core, said sense winding comprises a first sense winding, and said sensing circuit comprises:
    a second constantly biased magnetic core through which conductors of the source and return currents extend, said second core opposedly biased relative to said first core;
    a second sense winding around said second core, said second sense winding carrying said AC signal; and
    a pair of capacitors that provide a differential voltage in response to said change in small signal impedance, and
    wherein said detection circuit further comprises a controller that eliminates an initial difference voltage across said capacitors.

8. A detection circuit that detects a difference between a source current and a return current, the detection circuit comprising:
- a pair of magnetic cores through which conductors of the source and return currents extend;
- a bias winding and a sense winding around each said core, said bias windings carrying opposed DC signals, said sense windings carrying an AC signal from an AC source connected between the sense windings; and
- a sensing circuit driven by the AC signal that senses a shift in at least one operating point set by at least one said DC signal relative to at least one of said cores;
- said sensing circuit comprising a pair of capacitors, each capacitor connected in series with a corresponding one of the sense windings.

9. The detection circuit of claim 8 wherein at least one of said cores is biased near saturation.

10. The detection circuit of claim 8 wherein said pair of capacitors generate a differential voltage in response to said shift in at least one operating point.

11. The detection circuit of claim 10 further comprising a controller that eliminates an initial difference voltage across said capacitors.

12. A detection circuit that detects a difference between a source current and a return current, the detection circuit comprising:
- a magnetic core through which conductors of the source and return currents extend;
- a bias winding and a sense winding around said core, said bias winding carrying a DC signal; and
- a sensing circuit in series with the sense winding and that senses a change in small signal impedance of the sense winding as the sense winding transmits an AC signal to the core from an AC source connected with the sense winding,
- wherein said core comprises a first core, said bias winding comprises a first bias winding, said sense winding comprises a first sense winding, said detection circuit further comprising:
- a second magnetic core through which conductors of the source and return currents extend;
- a second bias winding and a second sense winding around said second core, said second bias winding biased oppositely to said first bias winding, said second sense winding transmitting said AC signal from the AC source to said second core; and
- a pair of capacitors that provide a differential voltage in response to said change in said small signal impedance, said differential voltage representing the difference between the source and return currents.

13. The detection circuit of claim 12 wherein said DC signal biases said core near saturation.

14. The detection circuit of claim 12 wherein said sensing circuit comprises a capacitor that receives said AC signal.

15. The detection circuit of claim 12 wherein said sensing circuit comprises a capacitor in series with the sense winding.

16. The detection circuit of claim 12 further comprising a controller that eliminates an initial difference voltage across the capacitors.

17. A vehicle comprising a detection circuit that detects a difference between a source current and a return current in an electrical circuit of the vehicle, said detection circuit comprising:
- a magnetic core through which conductors of the source and return currents extend;
- a bias winding and a sense winding around said core, said bias winding biased by a DC signal, said sense winding carrying an AC signal; and
- a sensing circuit connected with said sense winding that senses a shift in an operating point set by said DC signal relative to said core,
- wherein said core comprises a first core, said bias winding comprises a first bias winding, said sense winding comprises a first sense winding, and said sensing circuit comprises:
- a second magnetic core through which conductors of the source and return currents extend;
- a second bias winding and a second sense winding around said second core, said second bias winding biased oppositely to said first bias winding, said second sense winding carrying said AC signal; and
- a pair of capacitors that provide a differential voltage in response to said shift in operating point,
- wherein said detection circuit further comprises a controller that eliminates an initial difference voltage across said capacitors.

18. The vehicle of claim 17 wherein said core is biased near saturation.

19. The vehicle of claim 17 wherein said sensing circuit comprises a capacitor that receives said AC signal.

20. The vehicle of claim 17 wherein said sensing circuit comprises a capacitor in series with said sense winding.

21. The vehicle of claim 17 wherein said sense winding transmits an AC signal to the core from an AC source connected with the sense winding between the capacitors.

* * * * *